(12) United States Patent
Yang et al.

(10) Patent No.: US 9,184,924 B2
(45) Date of Patent: Nov. 10, 2015

(54) NODES FOR COMMUNICATING CREDIT RELATED INFORMATION

(75) Inventors: Yong Yang, Mölndal (SE); John Stenfelt, Göteborg (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 16 days.

(21) Appl. No.: 13/579,001

(22) PCT Filed: Dec. 29, 2010

(86) PCT No.: PCT/EP2010/070848
§ 371 (c)(1),
(2), (4) Date: Aug. 14, 2012

(87) PCT Pub. No.: WO2011/101063
PCT Pub. Date: Aug. 25, 2011

(65) Prior Publication Data
US 2012/0309346 A1   Dec. 6, 2012

Related U.S. Application Data

(60) Provisional application No. 61/304,970, filed on Feb. 16, 2010.

(51) Int. Cl.
*H04L 12/14* (2006.01)
*H04W 4/24* (2009.01)
*H04M 15/00* (2006.01)

(52) U.S. Cl.
CPC ............ *H04L 12/14* (2013.01); *H04L 12/1403* (2013.01); *H04M 15/66* (2013.01);
(Continued)

(58) Field of Classification Search
CPC . H04M 2017/22; H04M 15/66; H04M 15/58; H04M 15/80; H04M 15/61; H04M 15/8038; H04M 15/64; H04M 15/70; H04M 15/00; H04M 15/8016; H04M 2215/208; H04M 15/715; H04M 15/725; H04M 15/8083; H04M 15/85
USPC .................. 455/405, 406, 407, 408; 379/114, 379/114.2; 705/39, 52, 54, 112
See application file for complete search history.

(56) References Cited

U.S. PATENT DOCUMENTS 7,937,300 B2 * 5/2011 Foottit et al. .................... 705/30
8,285,861 B2 * 10/2012 Hu et al. ........................ 709/228
(Continued)

OTHER PUBLICATIONS

Zte: "Proposal for optimization of PCC procedures by SY reference enhancement", 3GPP Draft; S2-101031_Proposal for Optimization of PCC Procedures by SY Reference Enhancement, 3rd Generation Partnership Project (3GPP), Mobile Competence Centre; 650, Route Des Lucioles; F-06921 Sophia-Antipolis Cedex; France, vol. SA WG2, no. San Francisco, USA; 20100222, Feb. 11, 2010, XP050433582, [retrieved on Feb. 11, 2010].
(Continued)

*Primary Examiner* — George Eng
*Assistant Examiner* — Joseph Dean, Jr.
(74) *Attorney, Agent, or Firm* — Christopher & Weisberg, P.A.

(57) ABSTRACT

A PCRF node (120) for a communications system, equipped with an interface (Gx) towards a PCEF node (130), in the system. The PCRF node (120) is arranged to use said interface to provide the PCEF node (130) with new or updated PCC rules for a User Equipment. The PCRF node (120) is also equipped with an interface (Sy) towards an OCS node (115), and is arranged to as a result of a trigger signal, request a credit indication for the new or updated PCC rules for the User Equipment from the OCS node (115) over the interface to the OCS node (115), to receive a credit indication for the new or updated PCC rules for the User Equipment from the OCS node (115) over the interface (Sy) to the OCS node, and to provide said credit information to the PCEF node (130). An OCS node (115) is also disclosed.

16 Claims, 3 Drawing Sheets

(52) U.S. Cl.
CPC .......... *H04M15/8016* (2013.01); *H04M 15/85* (2013.01); *H04M 15/852* (2013.01); *H04M 15/88* (2013.01); *H04W 4/24* (2013.01)

(56) References Cited

U.S. PATENT DOCUMENTS

| | | | | |
|---|---|---|---|---|
| 2007/0124160 | A1* | 5/2007 | Duan et al. | 705/1 |
| 2010/0010922 | A1 | 1/2010 | Foottit et al. | |
| 2010/0146596 | A1* | 6/2010 | Stenfelt et al. | 726/4 |
| 2011/0082776 | A1* | 4/2011 | Stenfelt | 705/30 |

OTHER PUBLICATIONS

3rd Generation Partnership Project; Technical Specification Group Services and System Aspects; Study on Policy solutions and enhancements (Release 10), 3GPP Standard; 3GPP TR 23.813, 3rd Generation Partnership Project (3GPP), Mobile Competence Centre ; 650, Route Des Lucioles ; F-06921 Sophia-Antipolis Cedex ; France, No. V0.1.1, Jan. 7, 2010, pp. 1-18, XP050401815, [retrieved on Jan. 7, 2010].

Ericsson et al: "Proposal for a new reference point between the PCRF and the OCS", 3GPP Draft; S2-097364_S2-096921_PCR_23813_ OCS_PCRF_INT ERFACE, 3rd Generation Partnership Project (3GPP), Mobile Competence Centre ; 650, Route Des Lucioles ; F-06921 Sophia-Antipolis Cedex ; France, no. Cabo; Nov. 16, 2009, XP050398070, [retrieved on Nov. 20, 2009].

International Search Report dated Apr. 5, 2011 for International Application No. PCT/EP2010/070848, International Filing Date: Dec. 29, 2010 consisting of 4-pages.

Singapore Patent & Trademark Office Written Opinion dated Dec. 2, 2013 for Singapore Application No. 201205190-0, Singapore Filing Date: Dec. 29, 2010 consisting of 12-pages.

1st Indonesian Office Action in Bahasa Indonesia language and English translation of 1st Indonesian Office Action dated Oct. 29, 2014 for Indonesian Application Serial No. W00-2012-03244 consisting of 4-pages.

* cited by examiner

NODES FOR COMMUNICATING CREDIT RELATED INFORMATION

CROSS-REFERENCE TO RELATED APPLICATIONS

This application is a Submission Under 35 U.S.C. §371 for U.S. National Stage Patent Application of International Application Number: PCT/EP2010/070848, filed Dec. 29, 2010 entitled "NODES FOR IMPROVED CREDIT VALIDATION," which claims priority to U.S. Provisional Application Ser. No. 61/304,970, filed Feb. 16, 2010, the entirety of both of which are incorporated herein by reference.

TECHNICAL FIELD

The present invention discloses nodes for improved credit validation in a communications system.

BACKGROUND

The Policy and Charging Control, PCC, architecture was introduced in 3GPP Rel-7 and has been further evolved in 3GPP Rel8 and Rel9. It provides operators with advanced tools for service-aware QoS and charging control.

For 3GPP Rel-10, there is currently a Study Item for Policy Enhancements that investigates various functional additions to the already existing architecture. Currently there are 4 key issues under investigation. One of those key issues is called "QoS and gating control based on spending limits". This key issues looks into the case when the QoS (bandwidth) of an ongoing session must be throttled due to the fact that the user has reached some form of credit related limit. One example might be that the user is roaming (data services while roaming is often expensive and charged per Megabyte) and has a pre-defined safety limit of e.g. 50 Euros when the bandwidth should be set to a minimum until the user has been informed and once again agreed to be charged for another 50 Euros.

In the current PCC architecture, when a new PDN-connection is set up or when it is being modified, the PCEF (i.e. PDN-GW or GGSN) always queries the PCRF over the Gx interface, i.e. the interface between PCEF and PCRF, for a policy decision prior to requesting credit from the OCS over the Gy interface, i.e. the interface between PCEF and OCS. There are two alternatives defined for when credit requests over the Gy interface may take place according to the present 3GPP standard. One alternative is to request credits from the OCS over the Gy interface immediately at PDN-connection establishment, and another alternative is to delay the request of credit until an incoming payload packet is classified by the PCEF to an authorized service for which online charging applies.

SUMMARY

It is a purpose of the present invention to provide a solution which will provide improvements to the procedure which is used at present when a new PDN-connection is set up or when an existing PDN connection is modified.

This purpose is addressed by the present invention in that it discloses a Policy and Charging Rules Function node, a PCRF node, for a communications system. The PCRF node of the invention is equipped with an interface towards a Policy and Charging Enforcement Function node, a PCEF node, in the communications system and is arranged to use this interface to provide the PCEF node with new or updated Policy and Charging Control, PCC, rules for an end user, here referred to as a User Equipment, abbreviated as UE, in the communications system.

According to the invention, the PCRF node is also equipped with an interface towards an Online Charging System node, an OCS node, in the communications system, and is also arranged to:
  As a result of a trigger signal which is internal or external to the PCRF node, request a credit indication for the new or updated PCC rules for the UE from the OCS node over the interface to the OCS node,
  As a result of the request, receive a credit indication for the new or updated PCC rules for the UE from the OCS node over the interface to the OCS node,
  To provide the credit information to the PCEF node over the interface to the PCEF node.

In some embodiments, the PCRF node of the invention is arranged to provide the credit information to the PCEF node in a charging policy decision which the PCRF node transmits to the PCEF node.

In some embodiments of the PCRF node of the invention, the internal trigger signal is a timer.

In one embodiment in the PCRF node of the invention, the external trigger signal is one or more of the following:
  a session activation request from the UE,
  a session modification for the UE,
  a request for a new or changed service for the UE,
  a received update in the UE's subscription data.

In some embodiments, the PCRF node of the invention is arranged to request the credit indication per service, group of services or per rating group used by the UE.

In one embodiment of the PCRF node of the invention, the interface towards the OCS node is the Sy interface.

In one embodiment of the PCRF node of the invention, the interface towards the PCEF node is the 3GPP Gx interface.

The invention also discloses an Online Charging System node, an OCS node, in a communications system. The OCS node is equipped with an interface towards a Policy and Charging Rules Function node, a PCRF node, and the OCS node is arranged to receive a request for a credit indication for a service, group of services or rating group associated with one or more Policy and Charging Control rules, PCC rules, for a User Equipment from the PCRF node over the interface to the PCRF node, and, as a result of said request, to transmit a credit indication for the service, group of services or rating groups for the User Equipment to the PCRF node over the interface to the PCRF node.

In some embodiments of the OCS node, the interface to the PCRF node is the Sy interface.

In addition, the invention also discloses a Policy and Charging Enforcement node, a PCEF node, for a communications system. The PCEF node is equipped with an interface towards a Policy and Charging Rules node, a PCRF node, and with an interface towards an Online Charging System node, an OCS node.

The PCEF node is arranged to receive rules for Policy and Charging Control, PCC rules, for a User Equipment in the communications system from the PCRF node over the Gx interface. The PCEF node is arranged to, if the PCC rules for the UE contain a credit indication that indicate that the UE has sufficient credit to utilize the service or services associated with the credit, wait for the UE to start utilizing the system, and when that happens, to establish a session with the OCS node over the interface to that node. If the PCC rules received from the PCRF node contain a credit indication that indicate that the UE doesn't have sufficient credit to utilize the service or services associated with the credit, the PCEF node is arranged to establish a session with the OCS node over the Gy interface and await a decision from the OCS node regarding actions to be taken with traffic from the UE.

In some embodiments of the PCEF node, the interface to the PCRF node is the 3GPP Gx interface.

In some embodiments of the PCEF node, the interface to the OCS node is the 3GPP Gy interface.

BRIEF DESCRIPTION OF THE DRAWINGS

The invention will be described in more detail in the following, with reference to the appended drawings, in which.

DETAILED DESCRIPTION

Figure 1:
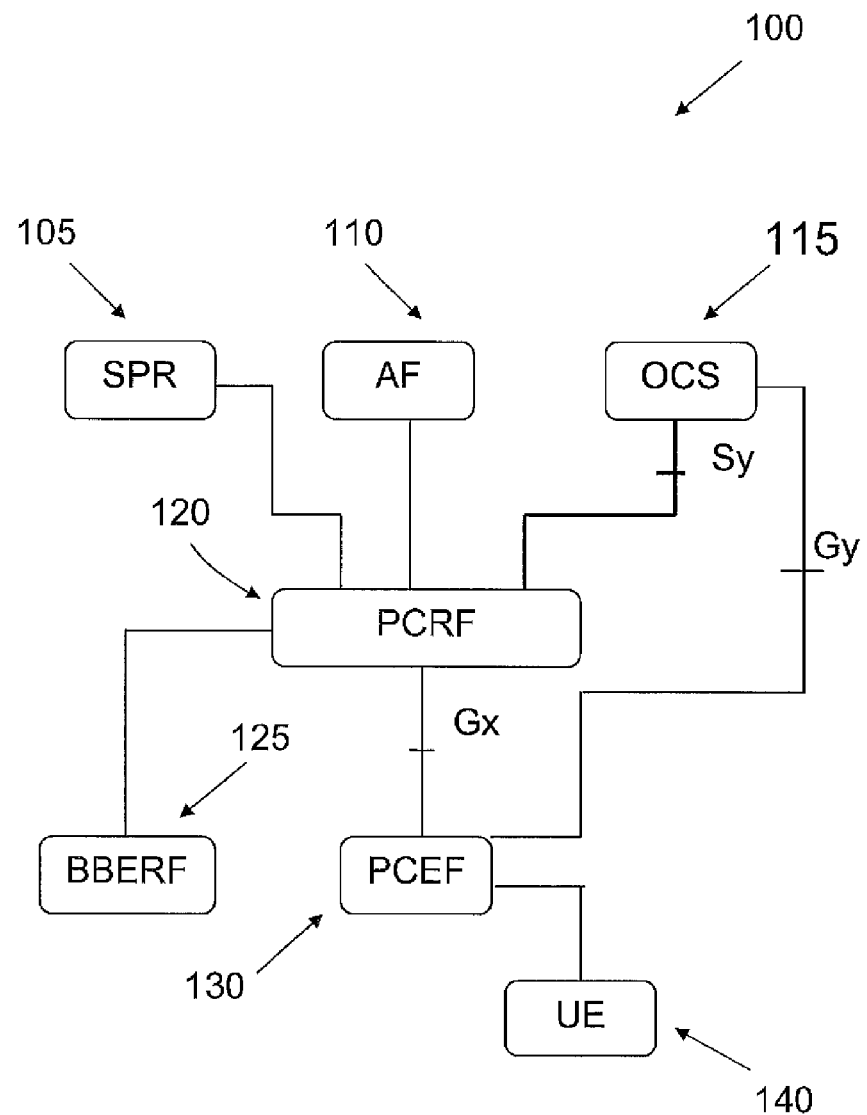
FIG. 1 shows an overview of a system in which the invention is applied.

FIG. 1 shows an overview of a communications system 100 in which the invention is applied. The invention will be described by means of the system 100 in FIG. 1, using terminology which is taken from the 3GPP project. It should however be emphasized that the invention is also applicable within systems which are "wire bound", i.e. system which use landlines.

As shown in FIG. 1, the system 100 comprises the following nodes or components:
AF, 110, Application Function,
BBERF, 125, Bearer Binding Event Reporting Function,
OCS, 115, Online Charging System,
PCEF, 130, Policy and Charging Enforcement Function,
PCRF, 120, Policy and Charging Rules Function,
SPR, 105, Solution Profile Repository
UE, 140, User Equipment, sometimes also referred to as an "end user".

As is also shown in FIG. 1, in the system 100 there are interfaces between some of the nodes or components. Thus, between the PCEF 130 and the PCRF 120 there is the so called Gx interface, and between the PCEF 130 and the OCS 115, there is the so called Gy interface. These interfaces are known to those skilled in the art and will therefore not be described in further detail here.

The present invention proposes opening up an interface between the OCS 115 and the PCRF 120, in addition to the existing interfaces in the system 100. The proposed interface (sometimes also referred to as a "reference point") between the OCS 115 and the PCRF 120 is labeled Sy interface, and is shown in bold lines in FIG. 1, in order to facilitate for the reader.

One purpose of introducing the Sy interface is to address the case sometimes known as "QoS and gating control based on spending limits". This case occurs when the QoS (Quality of Service, e.g. bandwidth) of an ongoing session must be "throttled" due to the fact that the user has reached some form of credit related limit. One example might be that the user is roaming (data services while roaming is often expensive and charged per Megabyte) and has a pre-defined safety or billing limit of e.g. 50 Euros. In such cases, it might be advantageous to set the bandwidth to a minimum e.g. until the user has been informed that the credit limit has been reached and has agreed to be charged for another 50 Euros, or until a certain payment period, such as, for example, the present month, has ended.

In some embodiments of the present invention, the Sy interface will be initiated by the PCRF 120 at an IP-CAN session establishment for the UE 140 and will be used to transfer charging related information from the OCS 115 to the PCRF 120. Based on this information, the PCRF 120 can then make policy decision, such as e.g. altering the QoS of the user. Possible other use cases of the Sy interface include:
Notification that the UE is out of credit;
Notification that the UE is not out of credit;
Notification that the UE is currently "promoted", i.e. has a certain status within the operator's network, such as e.g. "gold client";
Notification that the UE has reached a certain credit threshold (e.g. 50 Euros).

As stated previously, it is a purpose of the present invention to provide a solution which will provide improvements to the procedure which is used at present when a new PDN connection is set up or when an existing PDN connection is modified. To this end, by means of the introduction of the Sy interface, the PCRF 120 will be able to get an early credit indication from the OCS 115, possibly per service, or group of services or per so called rating group. The PCRF 120 can then indicate this over the Gx interface to the PCEF, which for example can be a PGW, PDN Gateway, or a GGSN, or will be embodied in such nodes. With this information, the PCEF 130 can safely allow traffic to flow for all associated services, group of services or rating groups for which the PCRF has indicated that credit is available during the time of the credit request over Gy. This would greatly reduce the procedures associated with "QoS and gating control based on spending limits". In addition, the PCEF could in an initial request over the Gx to the PCRF request early credit indications to be provided, or the PCRF could request over Sy that the OCS notifies the PCRF in case the user's account becomes empty or refilled, possibly per service, group of services or per rating group. In addition, the PCRF could notify the PCEF over the Gx interface in the case that there is a change in previously provided credit indications, possibly per service, group of services or per rating group.

The invention also discloses an improved PCEF node 130. The PCEF node 130 is, as shown in FIG. 1 and as mentioned above, equipped with a Gx interface towards the PCRF node 120, and with a Gy interface towards the Online Charging System node, the OCS node 115. The PCEF node 130 is arranged to receive rules for Policy and Charging Control, PCC rules, for a UE 140 in the communications system 100 from the PCRF node 120 over the Gx interface. As disclosed by the invention, the PCEF node 130 is arranged to, if the PCC rules for the UE 140 contain a credit indication that indicate that the UE has sufficient credit to utilize the service or services associated with the credit, wait for the UE 140 to start utilizing the system, and when that happens, to establish a session with the OCS node over the Gy interface to the OCS node. If, on the other hand, the PCC rules received from the PCRF node 120 contain a credit indication that indicate that the UE 140 doesn't have sufficient credit to utilize the services associated with the credit, the PCEF node 130 is arranged to establish a session with the OCS node 115 over the Gy interface to the OCS node and to await a decision from the OCS node regarding actions to be taken with traffic from the UE 140.

Figure 2:
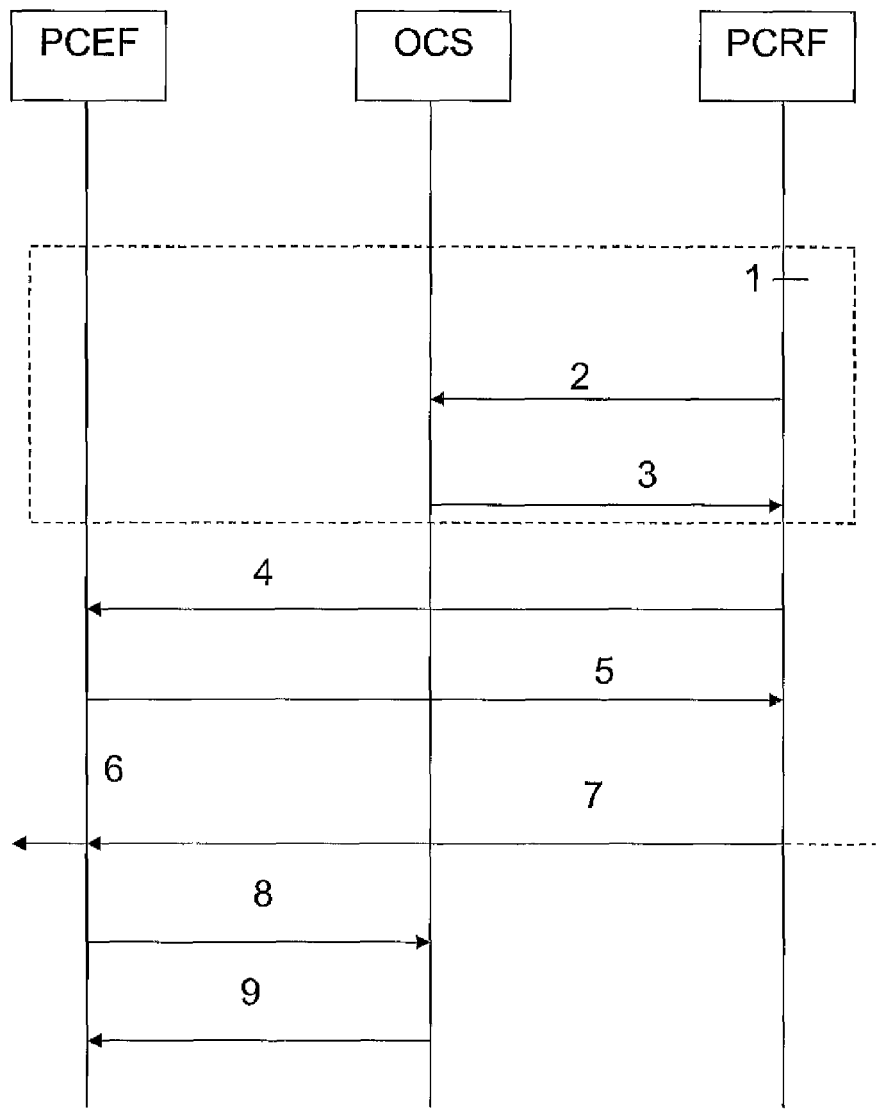
FIGS. 2 and 3 show event diagrams in a system in which the invention is used.

An example of an event sequence in a system in which the present invention is applied will now be given with reference to FIG. 2, which shows events and messages sent between the nodes PCEF 130, OCS 115 and PCRF 120 in the system 100 of FIG. 1. Events 1-3 have been framed with dashed lines in order to indicate that these are the events in FIG. 2 which are primarily related to the present invention.

The events and messages of FIG. 2 have been numbered sequentially, and are as follows:
1. The PCRF decides to install a new or modified PCC rules in the PCEF. The decision is triggered either by an event external or internal to the PCRF. Examples of internal such events are timers, and examples of external such events are one or more of the following:
  a session activation request from the UE,
  a session modification for the UE,
  a request for a new or changed service for the UE,
  a received update in the UE's subscription data.
  an update in the user's subscription from the SPR,
    Note that for the case of a session activation request, such as for example, an IP-CAN Session Establishment, the PCEF may have specifically requested an early credit indication from the PCRF.
2. The PCRF issues a request to the OCS over the Sy interface and requests an early credit indication for the new or modified service(s).
3. The OCS responds over the Sy interface with the requested credit indicator(s).
4. The PCRF formulates a policy decision and provides this decision to the PCEF. The policy decision also includes the credit indication (possibly per service, group of services, PCC rule or per rating group).
5. The PCEF acknowledges the policy decision message.
6. Because of the credit indicator(s), the PCEF knows if the account of the end user is empty or not and therefore, in case the account is not empty i.e. the credit indication(s) was positive, does not have to request credits for the associated rating groups and/or services immediately. Potential bearer or session related signaling may take place as specified in 3GPP TS 23.203.
7. At a later point in time, an incoming payload packet from the UE (i.e. uplink) or from an external network (i.e. downlink) is classified by the PCEF to an authorized service for which online charging applies, but where the credit request has been delayed due to a positive credit indication received in step 4. The payload is allowed to flow, but the PCEF immediately starts to measure the traffic (in time, volume or service specific units).
8. Step 7 triggers the PCEF to perform a credit request for the associated service or rating group.
9. Credit is granted by the OCS. The PCEF deducts the measured amount of credits that has already been consumed since step 7.

Figure 3:
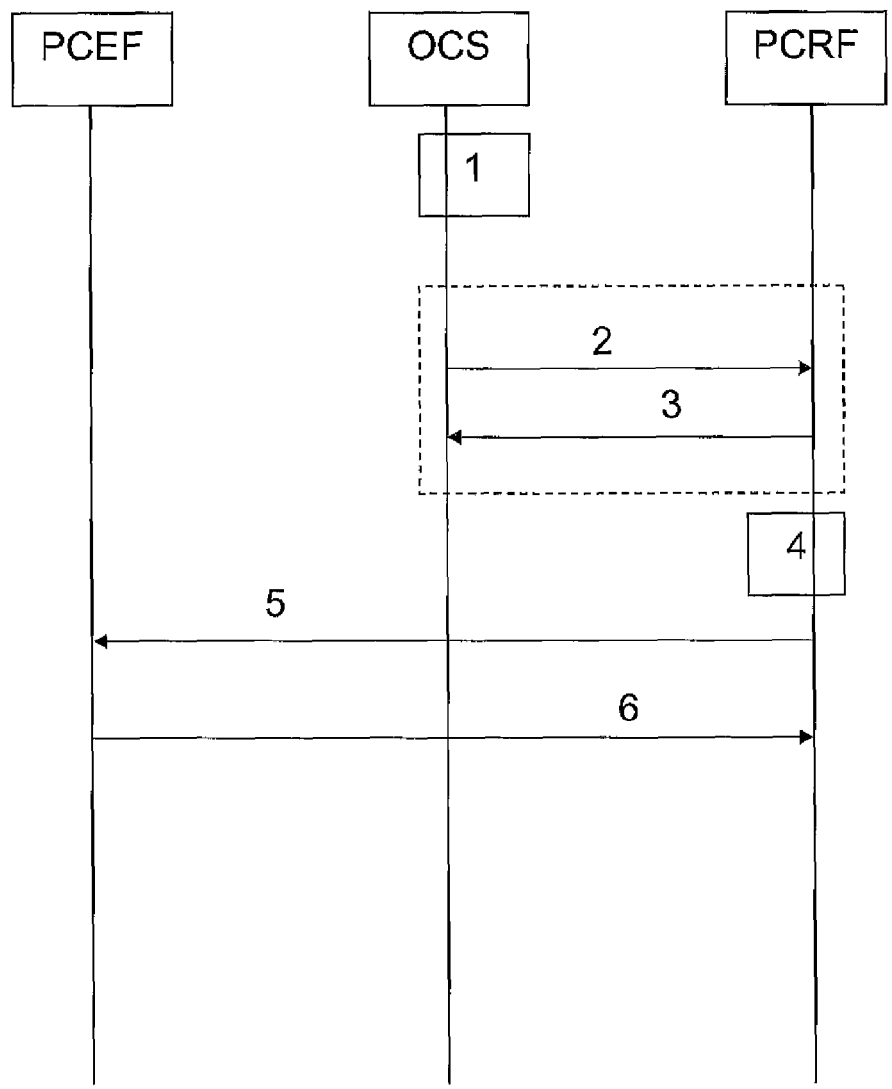

Another example of an event sequence in a system in which the present invention is applied will now be given with reference to FIG. 3, which shows events and messages sent between the nodes PCEF 130, OCS 115 and PCRF 120 in the system 100 of FIG. 1. Events 2 and 3 have been framed with dashed lines in order to indicate that these are the events in FIG. 3 which are primarily related to the present invention.

The events and messages of FIG. 3 have been numbered sequentially, and are as follows:
1. In the OCS, the account status of a UE is changed beyond a certain threshold limit. This may e.g. happen because the account is refilled or because the value of the account is exhausted.
2. The OCS transmits a Credit Report Update to the PCRF.
3. The PCRF transmits an acknowledgment, ACK, of this to the OCS.
4. The PCRF establishes a new condition for the user of the account in question.
5. The PCRF transmits the Policy Decision Update to the PCEF, for example as new or updated credit indicators.
6. The PCEF transmits an acknowledgment, ACK, of this to the PCRF.

The invention is not limited to the examples of embodiments described above and shown in the drawings, but may be freely varied within the scope of the appended claims.

The invention claimed is:
1. A Policy and Charging Rules Function node, PCRF node (120), for a communications system (100), the PCRF node (120) configured to:
  communicate with a Policy and Charging Enforcement Function node, PCEF node (130), in the communications system (100), over the first interface (Gx);
  provide the PCEF node (130) with one of new and updated Policy and Charging Control, PCC, rules for a User Equipment (140) in the communications system (100) over the first interface;
  communicate with an Online Charging System node, an OCS node (115), in the communications system over the second interface (Sy);
  as a result of a trigger signal which is one of internal and external to the PCRF node (120), request a credit indication for one of new and updated PCC rules for the User Equipment from the OCS node (115) over the second interface (Sy);
  as a result of said request, receive a credit indication for the one of new and updated PCC rules for the User Equipment from the OCS node (115) over the second interface (Sy); and
  provide said credit indication to the PCEF node (130) over the first interface (Gx).
2. The PCRF node (120) of claim 1, the PCRF node (120) being arranged to provide the credit indication to the PCEF node (130) in a charging policy decision which the PCRF node (120) transmits to the PCEF node (130).
3. The PCRF node (120) of claim 1, in which the internal trigger signal is a timer.
4. The PCRF node (120) of claim 1, in which the external trigger signal is at least one of:
  a session activation request from the User Equipment (140),
  a session modification for the User Equipment (140),
  a request for one of a new and changed service for the User Equipment (140), and
  a received update of subscription data corresponding to the User Equipment (140).
5. The PCRF node (120) of claim 1, the PCRF node (120) being arranged to request the credit indication per one of service, group of services and rating group used by the User Equipment (140).
6. The PCRF node (120) of claim 1, in which the second interface is different from a 3GPP Gx interface and 3GPP Gy interface.
7. The PCRF node (120) of claim 1, in which the first interface is a 3GPP Gx interface.
8. An Online Charging System node, OCS node (115), in a communications system, the OCS node (115) being equipped to use a first interface to communicate with a Policy and Charging Rules Function node, PCRF node (120), and to use a second interface to communicate with a Policy and Charging Enforcement node (130), PCEF node, the OCS node (115) being arranged to:
  receive a request for a credit indication for one of a service, group of services and rating group associated with at least one Policy and Charging Control rules, PCC rules, for a User Equipment (140) from the PCRF node (120) over the first interface; and as a result of said request, transmit the credit indication for the one of the service, group of services and rating groups for the User Equipment (140) to the PCRF node (120) over the first interface; and if the transmitted credit indication indicates credit is available for the one of the service, group of services and rating group for the User Equipment (140), receive a credit request over the second interface from the PCEF node.

9. The OCS node (115) of claim 8, in which the first interface is different from a 3GPP Gx interface and 3GPP Gy interface.

10. The PCRF node (120) of claim 2, in which the external trigger signal is at least one of:
- a session activation request from the User Equipment (140);
- a session modification for the User Equipment (140);
- a request for one of a new and changed service for the User Equipment (140); and
- a received update of subscription data corresponding to the User Equipment (140).

11. The PCRF node (120) of claim 2, the PCRF node (120) being arranged to request the credit indication per one of service, group of services and rating group used by the User Equipment (140).

12. The PCRF node (120) of claim 11, in which the second interface is different from a 3GPP Gx interface and 3GPP Gy interface.

13. The PCRF node (120) of claim 12, in which the first interface is a 3GPP Gx interface.

14. The PCRF node (119) of claim 13, in which the internal trigger signal is a timer.

15. The PCRF node (120) of claim 1, in which the external trigger signal is one of a session modification for the User Equipment (140) and received update of subscription data corresponding to the User Equipment (140).

16. The PCRF node (120) of claim 15, in which the second interface is different from a 3GPP Gx interface and 3GPP Gy interface.

* * * * *

UNITED STATES PATENT AND TRADEMARK OFFICE
CERTIFICATE OF CORRECTION

Page 1 of 1

PATENT NO.          : 9,184,924 B2
APPLICATION NO.     : 13/579001
DATED               : November 10, 2015
INVENTOR(S)         : Yang et al.

It is certified that error appears in the above-identified patent and that said Letters Patent is hereby corrected as shown below:

In the claims,

In Column 8, Line 10, in Claim 14, delete "The PCRF node (119)" and insert -- The PCRF node (120) --, therefor.

Signed and Sealed this
Eighth Day of March, 2016

Michelle K. Lee
*Director of the United States Patent and Trademark Office*